March 13, 1951  L. J. CUTHBERTSON  2,544,778

MOTOR MOUNT

Filed July 28, 1947  3 Sheets-Sheet 1

INVENTOR.
L. J. Cuthbertson
BY
James Atkins
Attorney

March 13, 1951     L. J. CUTHBERTSON     2,544,778
MOTOR MOUNT
Filed July 28, 1947     3 Sheets-Sheet 2
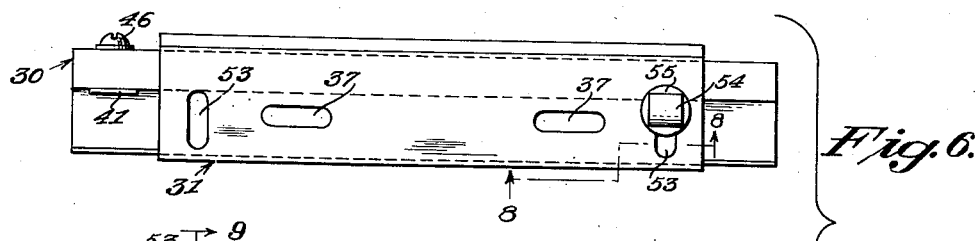
Fig. 6.
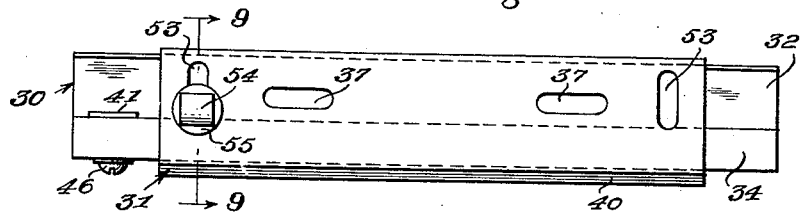
Fig. 7.
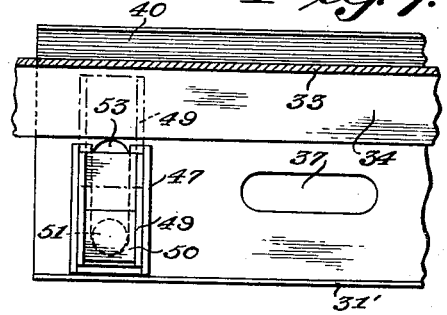
Fig. 9.
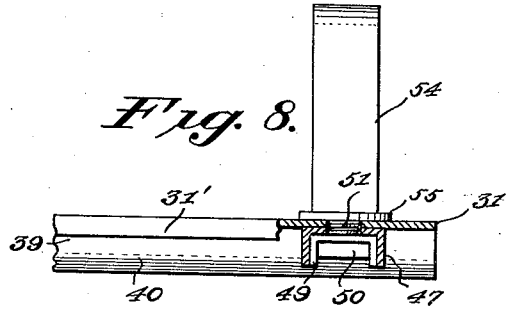
Fig. 8.
Fig. 10.
Fig. 11.
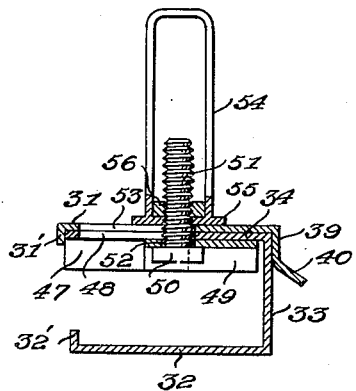
INVENTOR.
L. J. Cuthbertson
BY
James Atkins
Attorney.

March 13, 1951 L. J. CUTHBERTSON 2,544,778
MOTOR MOUNT
Filed July 28, 1947 3 Sheets-Sheet 3
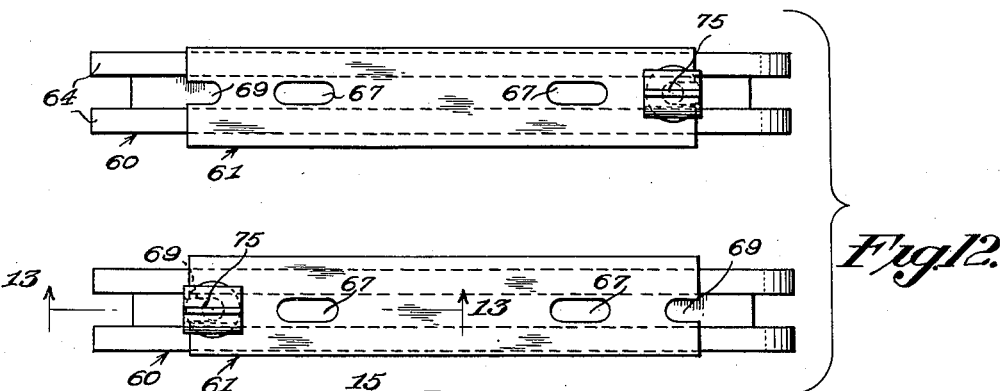
Fig. 12.
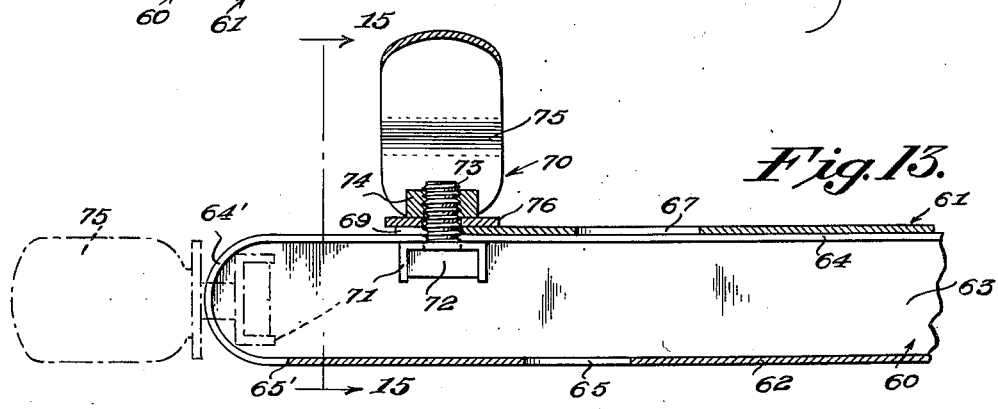
Fig. 13.
Fig. 14.
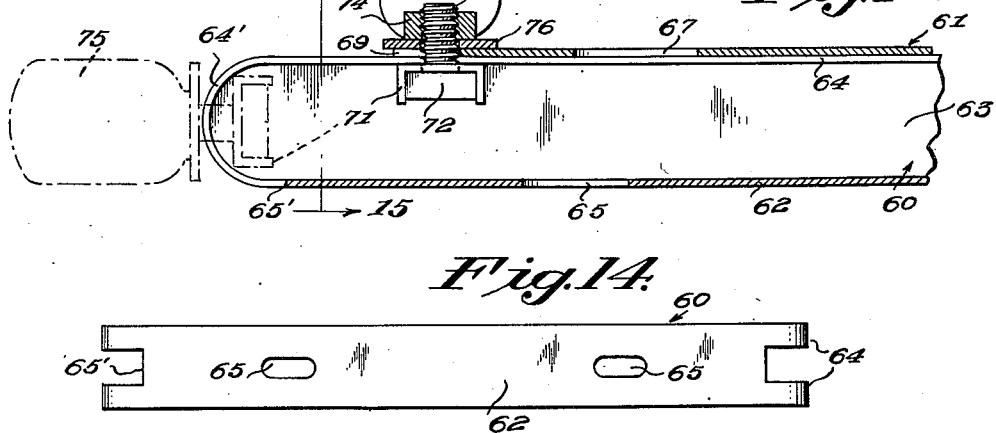
Fig. 15.
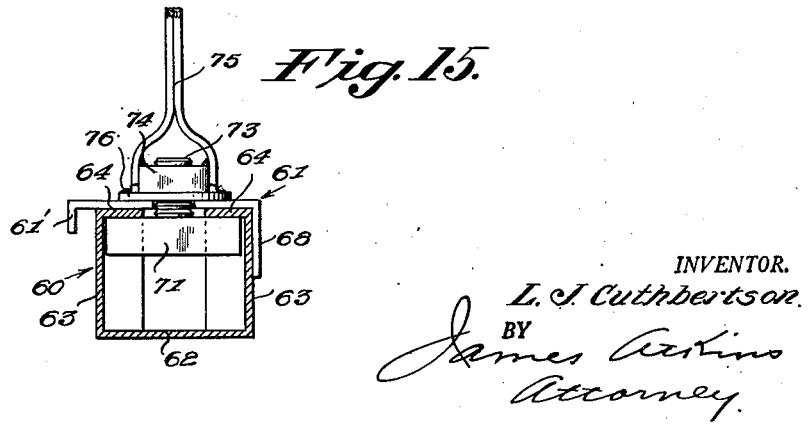
INVENTOR.
L. J. Cuthbertson
BY James Atkins
Attorney.

Patented Mar. 13, 1951

2,544,778

UNITED STATES PATENT OFFICE 2,544,778

MOTOR MOUNT

Leonard J. Cuthbertson, Girard, Kans.

Application July 28, 1947, Serial No. 764,108

13 Claims. (Cl. 248—23)

This invention relates to a motor mount.

The invention is particularly concerned with a mount for small electric motors ranging from one-sixteenth to one-half horse power, and more particularly for those of one-fourth, one-third and one-half horse power.

This small type motor has a wide range of use, since it is employed for driving numerous forms of work shop tools in factories as well as in private homes, and such motors find many other diversified uses commercially as well as in and around private homes and farms.

In instances where a plurality of machines or tools are used, such as in home work shops, including saws, sanders, grinders, buffers, tool grinders, mover sickle grinders, etc., it is the common practice to provide each such machine or tool with a driving motor, and this practice applies also to motor-driven machines and tools in commercial use.

The provision of a motor for each individual machine or tool is an expensive proposition. Thus, the conventional one-quarter horse power motor together with a belt and pulley represent an investment of several dollars and often more than the cost of some machines or tools to be driven thereby.

In instances where several motor-driven machines or tools are provided, as, for example, in home work shops, usually only one such machine or tool is used at any one time, and in fact it may well be that one or more of such machines or tools is used seasonally or on rare occasions, and thus the individual drive motor therefor renders very little service.

It is accordingly a primary object of this invention to provide a motor mount, in the use of which a single motor may be readily transported from one machine or tool to another and operatively connected therewith for driving same.

A further object of the invention is the provision of a motor mount including a supporting member adapted for rigid connection to a machine or bench and a motor base member adapted for rigid connection with a motor base, and the motor base member being removably supported on the supporting member, whereby the motor with its attached base member may be readily transported and supported on a similar supporting member associated with another machine or tool.

A still further object of the invention is the provision of a motor mount including supporting rails having provision for attachment to a machine or bench by means of bolts engaging the same holes previously used in attaching a motor in position, and base plates for rigid connection with the motor base and adapted for sliding support on the supporting rails.

A still further object of this invention is the provision of a motor mount of the above noted character wherein means are provided for readily adjusting belt tension.

Other objects and advantages of the invention will become apparent in the course of the following detailed description, taken in connection with the accompanying drawings, wherein:

Figure 6 is a view similar to Figure 1 disclosing a modified embodiment of the invention.

Figure 7 is an enlarged underside sectional view showing the application of the motor base plate clamping means.

Figure 8 is an enlarged sectional view in the plane of line 8—8, Figure 6.

Figure 9 is an enlarged section in the plane of line 9—9, Figure 6.

Figure 10 is a bottom plan view of the fixed element of the clamp.

Figure 11 is a bottom plan view of the movable element of the clamp.

Figure 12 is a top plan view of a still further modified form of the improved motor mount, the view being approximately one-half actual size.

Figure 13 is an enlarged sectional view in the plane of line 13—13, Figure 12.

Figure 14 is a bottom plan view of one of the supporting rails.

Figure 15 is a vertical sectional view in the plane of line 15—15, Figure 13.

Figure 1:
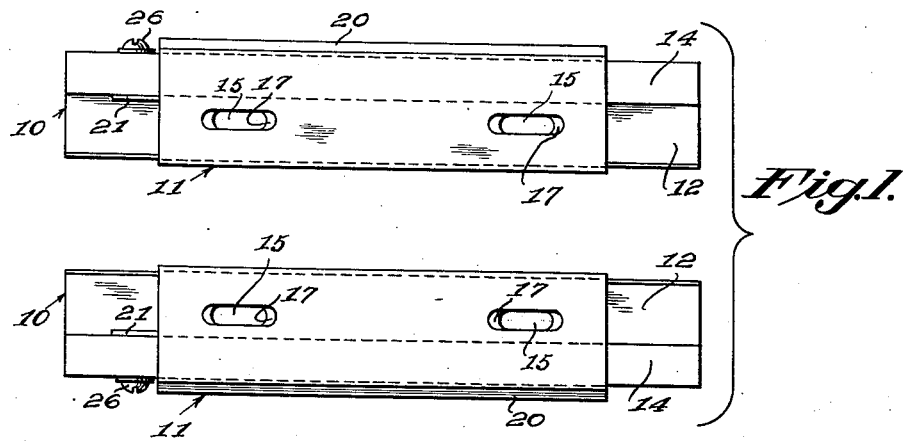
Figure 1 is a top plan view of the improved motor mount in accordance with one structural embodiment thereof, the view being approximately one-half actual size.
Figure 2:
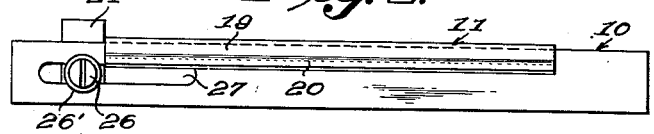
Figure 2 is a side elevational view of the mount.
Figure 3:
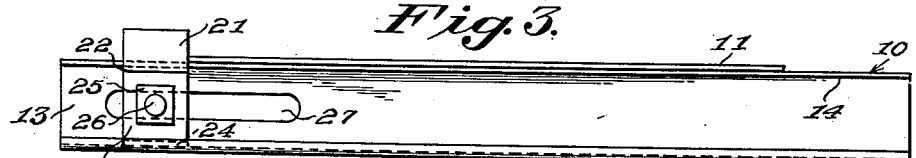
Figure 3 is an inside elevational view of the uppermost section of the mount shown in Figure 1 and being on a larger scale.
Figure 4:
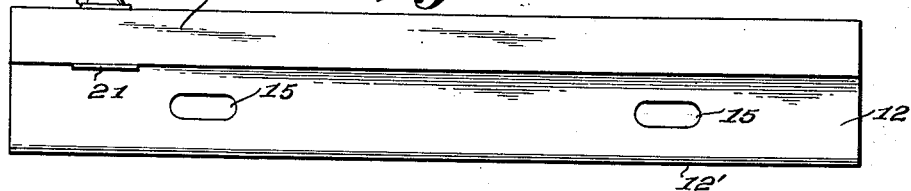
Figure 4 is a top plan view of one of the supporting rails.

Referring now in detail to the drawings and first to Figures 1 to 5 thereof, in which is illustrated the first embodiment of the invention, 10 designates a pair of supporting rails and 11 designates a pair of motor base plates cooperating with the supporting rails.

Each supportiing rail 10 is of generally channel construction and includes a horizontal base portion 12 which may terminate in a reinforcing flange or bead 12', a vertical portion 13, and a horizontal portion 14 disposed above and in vertically spaced relation to the horizontal portion 12. The horizontal portions 14 provide supporting flanges for the motor base plates 11, and the horizontal portions 12 are substantially wider than portions 14 and are provided with elongated bolt receiving apertures 15.

The rails 10 are rigidly connected to a machine or a bench B (Figure 5) by means of bolts 16 extending through the apertures 15, and the bolts are provided with nuts 16' bearing on washers 16''.

The motor base plates 11 are also provided with elongated apertures 17 through which are extended bolts 18 for securing the base b of motor M to the base plates, the bolts being provided with nuts 18' and washers 18''.

Figure 5:
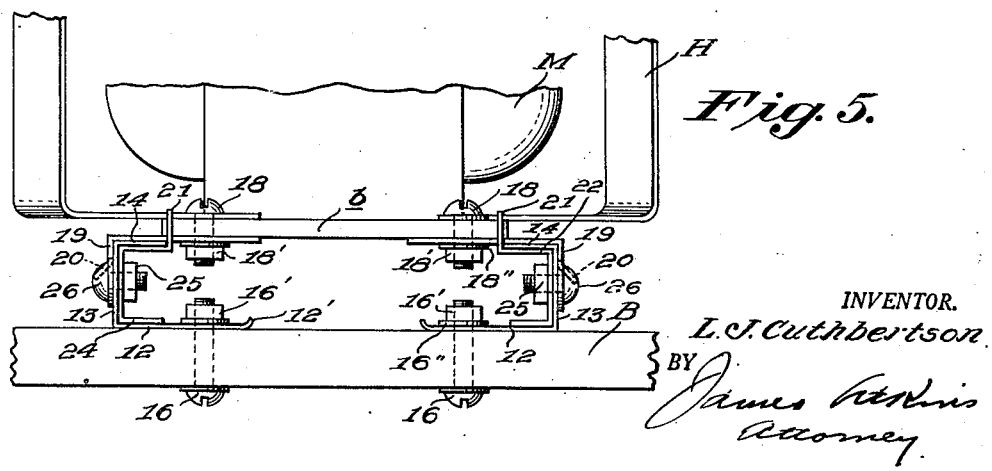
Figure 5 is an end elevation of the motor mount shown in position on a bench with a motor supported thereon.

The motor base plates comprise relatively wide motor base supporting portions having at their opposed outer edges vertical guide flanges 19 terminating in outwardly flared portions 20, as is more particularly indicated in Figure 5.

The motor M is preferably provided with a handle H which is broken away in Figure 5, but which is of closed loop formation and is adapted for carrying the motor from one operative position to another, as well as for wrapping of the electric cord therearound. The handle is preferably secured to the motor base b by means of the bolts 18.

The base plates 11 are adapted to rest by gravity on the flanges 14 of the supporting rails 10, particularly when the direction of drive is substantially horizontal, the weight of the motor being sufficient to retain same in operative position.

The flanges 19 on the base plates engage the outer walls of the vertical portions 13 of the supporting rails 10 and thus confine the motor against lateral movement.

In order to preclude movement of the motor longitudinally of the rails and towards the machine or tool being driven as well as for providing and maintaining proper tension in the driving belt, a stop 21 is provided on each rail 10, and such stops are adjustable longitudinally of the rails.

Each stop includes the stop portion proper 21, which engages the forward end of the respective base plate 11, a horizontal portion 22 disposed beneath and in engagement with flange 14, a vertical portion 23 engaging the inner wall of the vertical portion 13 of the rail, and a horizontal portion 24 engaging the horizontal portion 12 of the rail.

A nut 25 is rigidly secured as by welding to the inner face of the vertical portion 23 in axial alinement with an aperture in said vertical portion, and a bolt 26 extends through the aperture into threaded engagement with the nut 25, and the bolt extends through an elongated slot 27 in the vertical portion 13 of the rail 10. With this construction, the stops 21 may be readily adjusted longitudinally of the rails for variable length drive belts and for properly tensioning the belts.

This improved motor mount provides for use of a single motor for driving any one of a plurality of machines or tools. In use, the supporting rails 10 will be secured in properly alined relation to the machines or tools to be driven by means of the bolts 16.

At this point, it is to be observed that motor bases, particularly with respect to the smaller motors ranging up to three-quarters horse power, have been or are rapidly being standardized, and accordingly the bolts 16 may be extended through the same holes provided in the machine or bench for the reception of the bolts which previously held a motor thereto. At any rate, the variations in motor base dimensions of this class of motors is slight, and accordingly by the provision of separate rails and base plates, together with the elongated bolt-receiving apertures 15 and 17, the motor mount may readily be assembled by use of the existing motor-attaching bolt holes.

A pair of rails 10 will be properly secured in position adjacent each machine or tool to be motor driven.

A pair of the base plates 11 will be rigidly fastened by means of the bolts 18 to a base b of a motor M suitable for driving any of such machines or tools, and thus the motor may be readily transported from one to the other of an assembled pair of rails 10 for operative connection with the machine or tool adjacent thereto.

It is to be observed that the bolts 16 and 18 are vertically alined longitudinally of the mount, whereby the assembled base plates will accurately engage the supporting rails, and the outwardly flared portions 20 act as guides to direct the base plates into position on the rails.

Further emphasizing the original application of the improved motor mount to a bench or machine, holes for the reception of the supporting rail securing bolts 16 may exist, but if not the mount can be positioned for proper motor belt alinement and tension by marking and drilling holes for reception of the bolts 16.

Preferably, the bolts 16 are originally placed intermediate the ends of apertures 15 and then clamped just snugly. The motor, together with the base plates 11, may then be placed on the rails and the rails and plates so alined and spaced that the rails just fit snugly inside the base plate flanges 19 with sufficient clearance only to permit the base plates to slide freely on the supporting rails. The rails are now securely clamped by the bolts 16.

The belt is then placed on the driving and driven pulleys and the motor with its attached base plates moved on the rails in a direction away from the machine or tool being driven to effect proper belt tensioning. Now the stops 21 are moved into contact with the advance ends of the base plates and clamped in position by bolts 26.

The proper belt tension having now been attained, the stops 21 need not be further adjusted until the belt becomes worn and stretched or in the event of the substitution of a different length belt.

When it is desired to remove the motor from driving connection with any one machine or tool, the motor may be tipped forwardly, that is, by pivoting of the forward ends of the base plates on the stops 21, whereby the motor drive pulley approaches the driven pulley, with a resulting slackness in the belt sufficient to permit removal thereof, and the motor can then be dropped back on the rails.

The electric cord is wrapped about the handle H, which handle is then gripped by the hand of an operator, and the motor with its supported base plates transported to that pair of rails associated with the machine or tool desired to be operated.

The base plates will fall accurately into position on the rails. The motor, together with the base plates 11, is moved forwardly until the base plates contact the pre-adjusted stops 21 and the motor is then tipped forwardly for approach of its pulley to the driven pulley, whereby the belt may be readily positioned on the pulley. The motor is then dropped back with the base plates in full engagement with the rails with a resulting proper tension in the belt. The cord is then plugged in and the motor set into operation.

A motor can be transported from one operative position to another in a very short time.

The modified construction according to Figures 6 to 11 is adapted for use wherein the drive has a vertical component with a tendency for raising the motor off the supporting rails 10, while also providing for proper belt tensioning. The rails and motor base plates in accordance with this embodiment are similar to those of the first embodiment, but are preferably somewhat longer. However, those of the first embodiment may be of the same length as those of the second embodiment.

In Figures 6 to 11, the supporting rails are designated 30 and the motor base plates designated 31. The base plates may have marginal reinforcing beads or flanges 31', and such may be incorporated in the embodiment of Figures 1 to 5.

The rails 30 each includes a horizontal base portion 32, a vertical portion 33, and a base plate supporting portion or flange 34, which is substantially narrower than the horizontal base portion 32 and which is preferably provided with a reinforcing flange 32'.

The rails 30 are, of course, provided with bolt-receiving elongated apertures in their base portions 32 as in the first embodiment for securing the rails in operative position.

The motor base plates 31 are provided with elongated apertures 37 for receiving bolts to secure such plates to the motor base as in the first embodiment. The base plates are provided with guide flanges 39 terminating in positioning flared portions 40.

Preferably, the rails 30 are provided with stops 41 having securing bolts 46 as in the first embodiment, whereby the rails 30 may be used in both the first embodiment and the one now being described.

In this embodiment, clamps are provided for retaining the base plates 31 against horizontal and vertical movement relative to the rails 30, and as indicated in Figure 6, one such clamp is sufficient for each plate and cooperating rail, with the clamps disposed at opposite ends of the two cooperating plate and rail structures.

Each clamp comprises a channel member 47 rigidly secured to the under face of a respective base plate 31 and preferably abutting the reinforcing flange 31'. The member 47 is provided with an open-ended elongated slot 48, and a second channel member 49 is slidably disposed in the fixed channel member 47.

The head 50 of a bolt 51 is rigidly secured in the channel of member 49, and the bolt extends through an aperture 52 in the base of channel member 49, through the slot 48, and through an elongated slot 53 in the base plate 31.

A hand-operable nut is provided for bolt 51, the same preferably comprising an elongated U-shaped member 54 having its lower legs integral with or rigidly connected with a washer 55 and a nut 56.

It is to be observed that the base of channel member 47 is shown of the same thickness as the supporting flange 34 of the rail, but in actual practice the flange 34 is slightly the thicker, whereby same will be rigidly clamped between plate 31 and the channel member 49 when in the position of Figure 9.

The clamp is shown in inoperative position in Figure 7 and also in operative position in dotted lines. The clamps are moved to the full-line position in Figure 7 when it is desired to remove the motor with its base plates 31 from the rails 30, and when it is desired to lock the base plates in position with the belt properly adjusted the clamps are moved to the position of Figure 9. While only two of the clamps are necessary, the plates 31 are preferably provided with a slot 53 at each end thereof, and a channel member 47 may be rigidly supported beneath each slot for use of clamps at both ends if necessary, or the clamps may be disposed at the ends opposite to those at which they are shown.

In the third embodiment of the invention as illustrated in Figures 12 to 15 inclusive, the supporting rails are indicated at 60 and the motor base plates at 61.

The supporting rails 60 each includes a base portion 62, opposite side walls 63, and top motor base plate-supporting flanges 64. Thus, the rails are substantially of U-formation, as indicated in Figure 15. The rails 60 are provided with elongated apertures 65 in their base portions 62 for receiving bolts in attaching the rails to a machine or bench, and the plates 61 are provided with elongated apertures 67 for receiving bolts in securing the plates to a motor base, as in Figure 5. It is to be observed that the flanges 64 extend in semi-circular form around the opposite ends of the rails 60, as indicated at 64' in Figure 13, and such flanges merge with the base at 65'.

The base plates are provided with reinforcing flanges 61' and guiding flanges 68 which may, if desired, be provided with flaring positioning portions as in the other embodiments.

The base plates are provided with open-ended slots 69 in their ends for receiving clamp structures 70, only two of such being necessary and disposed as in Figure 12. However, a clamp 70 may be disposed in each slot if required.

Each clamp 70 comprises a channel member 71 disposed transversely of the associated rail and beneath the flanges 64 thereof. The head 72 of a bolt 73 is rigidly secured within the channel of member 71, and the bolt projects through an aperture in the base of channel member 71 and between the flanges 64. A hand-operable nut structure for the bolt 73 is provided, and same comprises a nut 74 threadedly engaged with the bolt 73 and rigidly connected with a hand-operable member 75 and a washer 76. The member 75 may be formed of a pair of straps welded at their upper ends, as indicated, and also welded at their lower ends to the nut 74 and washer 76.

By the provision of the rounded ends on the rails 60, the clamps upon loosening the nut structures 70 may be readily moved along the flanges 64 to a horizontal position, as indicated in dotted lines in Figure 13, thereby providing for unobstructed movement of the motor base plates 61 along the rails 60.

From the foregoing disclosure, it will be appreciated that a motor mount is provided whereby a number of machines or tools may be selectively driven by a single motor, which is readily transportable to and from one machine or tool to another and readily adjusted to operative position in driving association with any one of such machines or tools.

While I have disclosed my invention in accordance with certain specific structural embodiments thereof, such are to be considered as illustrative only, and not restrictive, the scope of the invention being defined in the following claims.

What I claim and desire to secure by U. S. Letters Patent is:

1. A motor mount comprising a pair of elongated motor supporting rails having slots therein for receiving attaching bolts in positions corresponding to the bolt receiving holes in motor bases of standard dimensions, a pair of motor base plates having slots therein for receiving bolts to secure said plates to a motor base, cooperating guide and seating surfaces on said rails and plates including side flanges on the plates engaging the outer sides of the rails for support of the plates on the rails with capacity for free movement lengthwise thereof, and adjustable means supported by the rails and engageable with corresponding ends of the plates for limiting said movement.

2. A motor mount comprising a pair of elongated motor supporting rails having horizontal base portions and horizontal flanges in vertical spaced relation thereto, attaching means for securing the rails in parallel laterally-spaced relation in fixed position within the standard motor base dimensions, a pair of motor base plates having apertures for receiving bolts to secure the plates to a motor base, the base plates adapted for seating engagement with said flanges, flanges on the base plates engageable with said rails outwardly of the flanges thereon for precluding lateral movement of the plates relative to the rails with capacity for free sliding movement of the plates lengthwise of the rails, and adjustable means for limiting said movement in at least one direction lengthwise of the rails.

3. A motor mount according to claim 2, wherein said adjustsable means include stops engageable with the ends of said plates and supported by the rails for adjustment lengthwise thereof.

4. A motor mount according to claim 2, wherein said adjustable means comprises releasable clamps movably supported by the base plates and operatively engageable with said flanges on the rails.

5. A motor mount according to claim 2, wherein said adjustable means comprises clamps movably supported by the rails and including opposed gripping portions engageable with the upper and lower faces of the plates adjacent certain ends thereof.

6. A motor mount comprising a pair of parallel laterally-spaced rails having horizontal attaching base portions, vertical side wall portions and horizontal flanges extending from said wall portions, a pair of elongated motor base plates having bolt-receiving apertures for attachment to a motor base, said plates being freely supported on said rail flanges and having flanges on their opposing edges engageable with said rails for confining the plates to free sliding movement lengthwise of the rails, and adjustable means for retaining the base plates against sliding movement in a direction toward the ends of the rails adjacent a machine or tool to be driven by a motor supported on the base plates.

7. A motor mount according to claim 6, wherein said adjustable means comprise vertically disposed stop elements engageable with ends of the base plates and adjustably supported by the vertical wall portions of the rails.

8. A motor mount according to claim 6, wherein said adjustable means comprise a clamp member slidably supported by each base plate and operatively engageable with the flange of the corresponding rail.

9. A motor mount according to claim 6, wherein said adjustable means comprise a clamp slidably supported by the flanges of said rails and operatively engageable with the plates adjacent certain ends thereof.

10. A motor mount according to claim 6, wherein said adjustable means comprise a clamp associated with each rail and its cooperating base plate, said clamps including bolts having vertically disposed hand-operable nut structures.

11. A motor mount comprising an elongated supporting rail member having a relatively wide attaching base, a vertically disposed side wall and a relatively narrow flange extending from the wall in overlying and spaced relation to the base, an elongated motor base plate member wider than the flange and freely supported thereon for movement lengthwise of the rail member, a vertical flange at one edge of the base plate member engageable with said vertical wall, and adjustable means carried by one of the members and engageable with the other member for retaining said plate member against movement in at least one direction lengthwise of the rail member.

12. A motor mount comprising a pair of elongated supporting rails having attaching bases and each provided with a pair of spaced flanges providing an elongated slot therebetween, a motor base plate freely supported on the flanges of each rail for sliding movement lengthwise thereof, each base plate having an open-ended slot in at least one end thereof and releasable clamping means supported by said rails, said clamping means being slidable in said slots when released to and from a position within the end slots in said plates, and said clamping means when moved into said slots and tightened engaging said plates to retain same in fixed position on said rails.

13. A motor mount according to claim 12, wherein said flanges are of semi-circular form at the ends of said rails providing for movement of said clamping means to an inoperative position below the base plate supporting portions of said rails.

LEONARD J. CUTHBERTSON.

REFERENCES CITED

The following references are of record in the file of this patent:

UNITED STATES PATENTS

| Number | Name | Date |
| --- | --- | --- |
| 1,211,352 | Rathburn | Jan. 2, 1917 |
| 1,964,542 | Straube | June 26, 1934 |
| 2,175,576 | Smith | Oct. 10, 1939 |